United States Patent [19]

O'Neal

[11] Patent Number: 4,802,536
[45] Date of Patent: Feb. 7, 1989

[54] LAWN DETHATCHER FOR A ROTARY CULTIVATOR

[76] Inventor: Ronald L. O'Neal, R.R. 2, Box 416, Sayre, Pa. 18840

[21] Appl. No.: 146,963

[22] Filed: Jan. 22, 1988

Related U.S. Application Data

[63] Continuation-in-part of Ser. No. 924,919, Oct. 30, 1986, abandoned, which is a continuation-in-part of Ser. No. 789,740, Oct. 21, 1985, abandoned.

[51] Int. Cl.⁴ .................... A01B 33/14; A01B 45/02
[52] U.S. Cl. ........................... 172/42; 172/21; 172/119; 172/548; 56/16.9; 56/249
[58] Field of Search .............. 172/42, 43, 21, 96, 172/76, 543, 247, 248, 249, 250, 251, 252, 119; 56/16.9, 16.1, 2, 400, 249

[56] References Cited

U.S. PATENT DOCUMENTS

| | | | |
|---|---|---|---|
| 1,846,507 | 2/1932 | Boring | 172/42 X |
| 2,229,497 | 1/1941 | Dontje | 172/21 |
| 2,273,120 | 2/1942 | Lindskog | 172/42 |
| 2,485,057 | 10/1949 | McCormick | 172/43 |
| 2,816,495 | 12/1957 | Brooks | 172/96 X |
| 2,864,294 | 12/1958 | Pearson | 172/42 |
| 2,902,098 | 9/1959 | Grunder | 172/21 |
| 2,998,690 | 9/1961 | Ferris | 172/16.9 |
| 3,125,844 | 3/1964 | Beyer | 172/543 X |
| 3,439,747 | 4/1969 | Kindlien et al. | |
| 3,455,398 | 7/1969 | Bowers | 172/247 X |
| 3,460,629 | 8/1969 | Shapland | 172/96 |
| 3,512,345 | 5/1970 | Smith | 172/16.9 |
| 3,564,823 | 7/1970 | Rhoads | 56/2 |
| 4,192,387 | 3/1980 | Stinson | 172/42 |
| 4,483,400 | 11/1984 | Arndt | 172/42 |

FOREIGN PATENT DOCUMENTS

| | | | |
|---|---|---|---|
| 3241135 | 8/1983 | Fed. Rep. of Germany | 172/21 |
| 2569938 | 3/1986 | France | 172/21 |
| 1540217 | 2/1979 | United Kingdom | 56/2 |

OTHER PUBLICATIONS

Promotional literature of Phoenix Manufacturing Company, Inc., two pages, "Till-A-Tach".

Primary Examiner—Richard J. Johnson
Attorney, Agent, or Firm—Woodard, Emhardt, Naughton Moriarty & McNett

[57] ABSTRACT

Interchangeable lawn dethatcher means for a rotary cultivator with removably affixed cultivating tines. The lawn dethatcher means includes a first rigid member and second rigid member each removably affixed to the rotary cultivator in place of the cultivating tines, and a plurality of rigid dethatchment tines removeably affixed in helical array to the first and second rigid members in mirror image relationship, respectively, each dethatchment tine being received through the rigid members and arrestingly clamped at the midpoint of the tine and each tine having a bent portion at each of its ends disposed in the direction opposite the intended direction of tine rotation. The lawn dethatcher means are supported at their outermost points from the rotary cultivator by independently rotatable utility wheels sized to permit the ends of the dethatchment tines to extent below the point of contact of the wheels with the lawn and thereby into contact with lawn thatch.

8 Claims, 3 Drawing Sheets

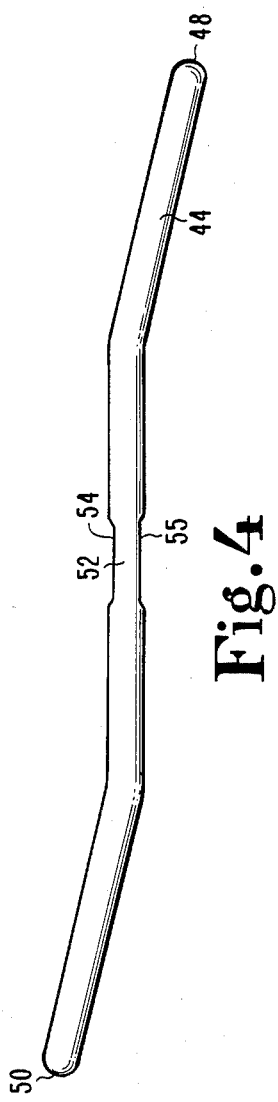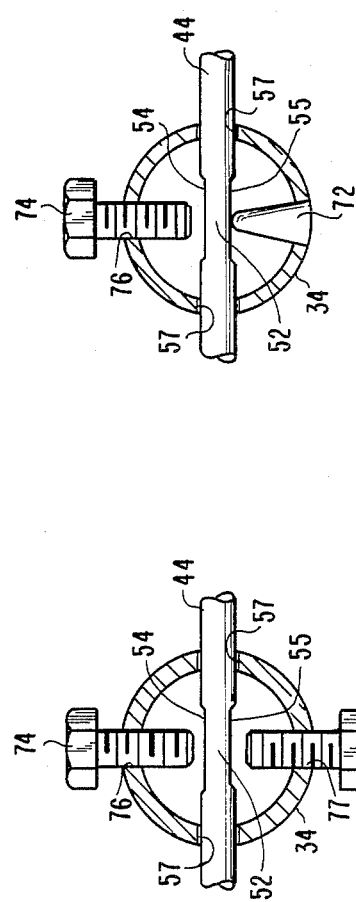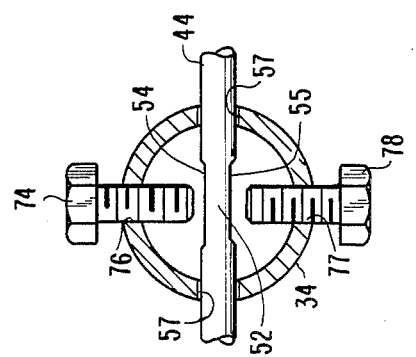

LAWN DETHATCHER FOR A ROTARY CULTIVATOR

This is a continuation-in-part application of Ser. No. 924,919, filed Oct. 30, 1986, abondoned, which is a continuation-in-part application of Ser. No. 789,740, filed Oct. 21, 1985, abondoned, entitled LAWN DETHATCHER FOR A ROTARY CULTIVATOR.

BACKGROUND OF THE INVENTION

1. Field of the Invention

This invention is in the field of rotary cultivators typically used in lawn and gardening care, and more specifically is in the field of grass lawn dethatcher attachments for such rotary cultivators.

2. Description of the Prior Art

Several patents have been issued that disclose a variety of self-powered and/or self-propelled apparatus for cultivating grass lawns to remove the matt of dead grass clippings that forms a brown blanket-like ground cover around the base of the live grass blades. This undesirable ground cover has become commonly known as thatch, and the devices to forcibly remove the thatch from amongst the blades of growing grass, with a minimum of damage to the growing grass, have become known as dethatchers.

Disclosed herein is a device that can be made available in kit form to owners of self-powered cultivators, that will be interchangeable with the soil cultivating tines provided with such cultivators, and that when attached to such cultivators in the manner disclosed, will convert the primary function of such cultivators from soil cultivation to grass lawn dethatching.

SUMMARY OF THE INVENTION

One embodiment of the present invention is a lawn dethatcher for use with a rotary cultivator having a rotatably driven shaft with a first end and a second end and removably affixed cultivating tines disposed at the first end and at the second end, comprising lawn dethatcher means selectively interchangeable with the cultivating tines, including a first rigid member with a third end and a forth end, a second rigid member with a fifth end and a sixth end, and a plurality of rigid dethatchment tines removeably affixed in helical array to the first rigid member between the third end and the fourth end, and removeably affixed in helical array to the second rigid member between the fifth end and the sixth end in mirror image relationship to the dethatchment tines affixed between the third end and the fourth end, attachment means to removably affix the lawn dethatcher means at the first end and the second end to tbe rotatably driven shaft of a rotary cultivator, and support means to position the lawn dethatcher means at the proper elevation to dethatch grass lawns, the support means being operable free from the rotational influence of the rotatably driven shaft.

Another embodiment of the present invention is a rotary cultivator, including a rotatably driven shaft with a first end and a second end, and removably affixed cultivating tines disposed a the first end and the second end, lawn dethatcher means selectively interchangeable with the cultivating tines, including a first rigid member with a third end and a forth end, a second rigid member with a fifth end and a sixth end, and a plurality of rigid dethatchment tines removeably affixed in helical array to the first rigid member between the third end and the fourth end, and removeably affixed in helical array to the second rigid member between the fifth end and the sixth end in mirror image relationship to the dethatchment tines affixed between the third end and the fourth end, lawn dethatcher means selectively interchangeable with the cultivating tines, attachment means to removably affix the lawn dethatcher means at the first end and the second end; and support means to position the lawn dethatcher means at proper elevation to dethatch grass lawns, the support means being operable free from the rotational influence of the rotatably driven shaft.

It is an object of the present invention to provide a grass lawn dethatchment attachment that can be made available in kit form to owners of garden-variety rotary cultivators that will be interchangeable with the soil cultivating tines provided with such cultivators, and that when removably attached to such cultivators will convert the primary function of such cultivators from soil cultivation to grass lawn dethatching.

Related objects and advantages of the present invention will be apparent from the following description.

BRIEF DESCRIPTION OF THE DRAWINGS

FIG. 4 is a side view of a tine 44 of FIG. 2.

FIG. 5 is an enlarged, fragmentary, and cross-sectional view of an alternate embodiment of the first rigid member of 34 of FIG. 2 taken along line 5—5 and viewed in the direction of the arrows.

FIG. 6 is an enlarged, fragmentary, and cross-sectional view of the first rigid member 34 of FIG. 2 taken along line 6—6 and viewed in the direction of the arrows.

DESCRIPTION OF THE PREFERRED EMBODIMENTS

Figure 1:
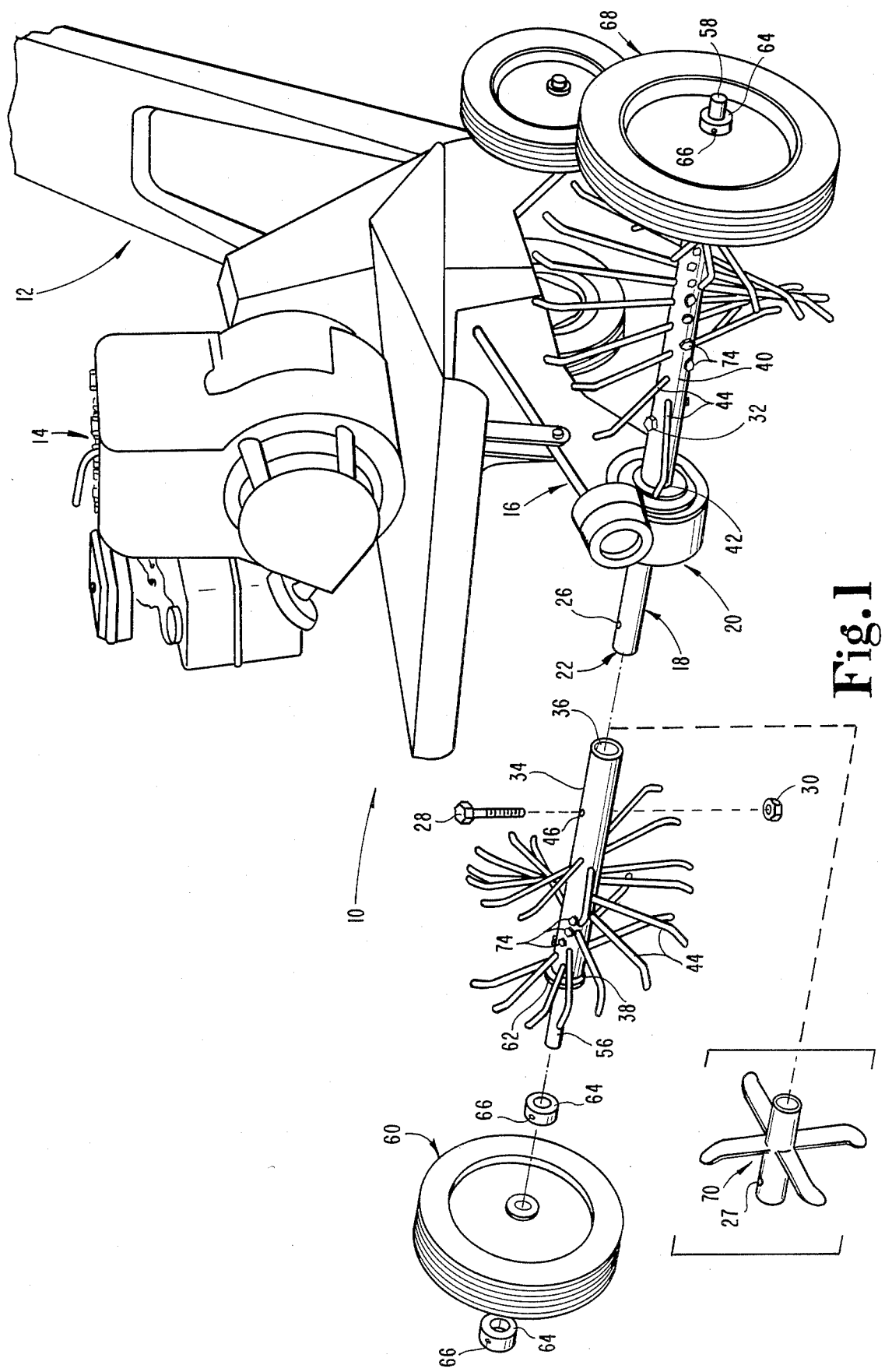
FIG. 1 is a perspective and partially exploded view of the preferred embodiment of the lawn dethatcher for a rotary cultivator that is the present invention.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the drawings, there is shown in FIG. 1 the preferred embodiment of the grass lawn dethatcher for a rotary cultivator 10 of the present invention. This preferred embodiment is composed of a garden-variety rotary cultivator 12 that is self-powered by an internal combustion engine 14. Engine 14 powers a forwardly disposed drive shaft 16, hidden from view in FIG. 1, which gearingly engages a rotatably driven shaft 18 at a right angle within gear box 20 of the rotary cultivator 12. When drive shaft 16 is engaged by the engine 14, rotatably driven shaft 18 is revolved about its axis clockwise when viewed from the right with respect to the operator's position, in direct proportion to the revolutions per minute of engine 14.

Still referring to FIG. 1, rotatably driven shaft 18 symmetrically exits gear box 20, there being shown in FIG. 1 the first end 22 of rotatably driven shaft 18. There is also a second end of rotatably driven shaft 18 that is equidistant from gear box 20 as is first end 22, but linearly disposed from gear box 20 diametrically opposite first end 22.

As is well known in the prior art, rotary cultivator 12 is provided with garden-variety cultivating tines 70 that are removably affixed to rotatably driven shaft 18 at its first end 22 and at its second end. Rotatably driven shaft 18 is provided with a first through-hole 26 disposed in proximity to first end 22 and along a diameter of rotatably driven shaft 18 to receive a first through-bolt 28, which also passes through a through-hole 27 provided in the cultivating tine 70 disposed at the first end 22 of rotatably driven shaft 18, thereby removably affixing the cultivating tine 70 at first end 22 when through-bolt 28 is fastened with first nut 30. In like manner, rotatably driven shaft 18 is provided with a diametrically disposed second through-hole disposed in close proximity to the seond end of rotatably driven shaft 18 and along a diameter thereof to receive a second through-bolt 32, which also passes through a through-hole provided in the cultivating tine disposed at the second end of rotatably driven shaft 18, thereby removably affixing the cultivating tine at the second end of rotatably driven shaft 18 when second through-bolt 32 is fastened with a second nut.

In FIG. 1, rotary cultivator 12 is shown with such cultivating tines already removed, which removal is accomplished in the reverse manner to that described above. Although through-bolt attachment means have been described for the preferred embodiment, it is contemplated that the attachment means utilized may vary and will be dictated by the attachment means utilized to removably affix the garden-variety cultivating tines 70 to rotatably driven shaft 18.

The rotary cultivator 12, as described above, is well known to the prior art and is readily available from a variety of sources. A rotary cultivator of this general type is the Montgomery Wards 5 h.p. Rotary Cultivator. Applicant has added the novel lawn dethatcher means disclosed herein to such a rotary cultivator.

Again referring to FIG. 1, the lawn dethatcher means disclosed herein includes a first rigid member 34 with a third end 36 and a forth end 38, and a second rigid member 40 with a fifth end 42 and a sixth end diametrically disposed to the fifth end 42 of second rigid member 40. It is preferred that first rigid member 34 and second rigid member 40 be hollow cylinders composed of a rigid metal, each having an inside diameter slightly larger than the outside diameter of rotatably driven shaft 18. First rigid member 34 and second rigid member 40 are slidably received by rotatably driven shaft 18, the third end 36 of first rigid member 34 being slidably received by first end 22 of rotatably driven shaft 18 in linear relation therewith, and the fifth end 42 of second rigid member 40 being received by the second end of rotatably driven shaf 18 also in linear relation therewith.

Figure 2:
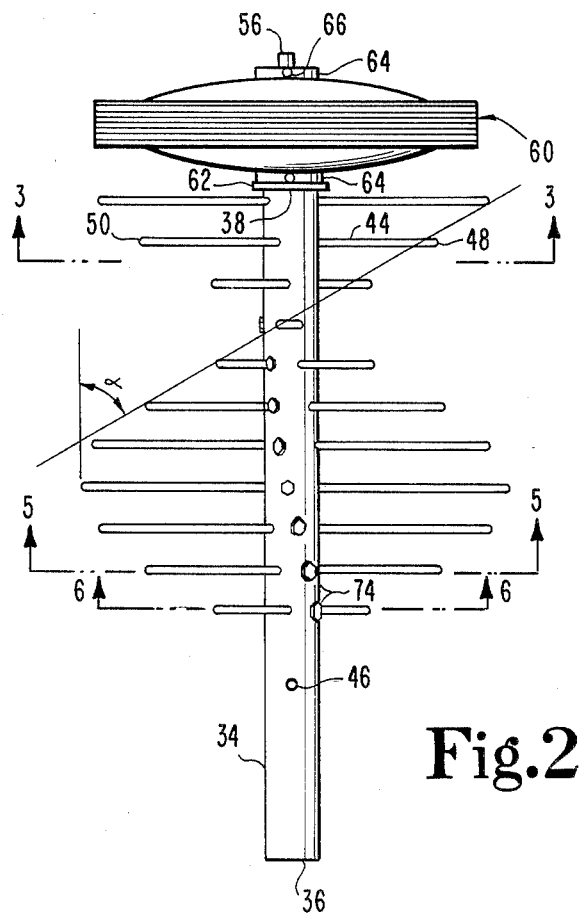
FIG. 2 is an enlarged top view of the first rigid member 34 with attached dethatchment tines 44 and first wheel 60 of FIG. 1.

Referring to FIGS. 1 and 2, first rigid member 34 is provided with a third through-hole 46 along a diameter of first rigid member 34, to receive first through-bolt 28. Third through-hole 46 is disposed in proximity to third end 36 of first rigid member 34 such that when first rigid member 34 is slidably received over first end 22 of rotatably driven shaft 18 in the manner described, and third end 36 of first rigid member 34 is in close proximity to gear box 20, the axis of first through-hole 26 of rotatably driven shaft 18 and the axis of third through-hole 46 of first rigid member 34 may be aligned to permit first through-bolt 28 to be passed along the aligned axes, through both first rigid member 34 and rotatably driven shaft 18. In symmetrical fashion, second rigid member 40 is provided with a fourth through-hole along a diameter of second rigid member 40, to receive second through-bolt 32, which fourth through-hole is disposed in proximity to fifth end 42 of second rigid member 40 such that when second rigid member 40 is slidably received over the second end of rotatably driven shaft 18 in the manner described, and fifth end 42 of second rigid member 40 is in close proximity to gear box 20, the axis of the second through-hole of rotatably driven shaft 18 and the axis of the fourth through-hole of second rigid member 40 may be aligned to permit second through-bolt 32 to be passed along the aligned axes, through both second rigid member 40 and rotatably driven shaft 18. As described, when first nut 30 is affixed to first through-bolt 28, and when second through-bolt 32 is similarly provided with a nut, first rigid member 34 and second rigid member 40 become removably affixed to rotatably driven shaft 18.

Figure 3:
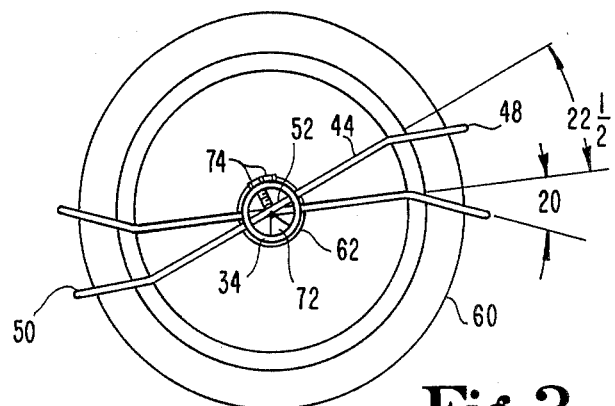
FIG. 3 is a cross-sectional view of the first rigid member 34 of FIG. 2 taken along line 3—3 and viewed in the direction of the arrows.

Referring to FIGS. 1, 2, and 3, rigidly affixed to first rigid member 34 and second rigid member 40 are a plurality of dethatchment tines 44 affixed in helical array from fourth end 38 toward the third end 36 of first rigid member 34, and from the sixth end toward the fifth end 42 of second rigid member 40. It has been determined that the helical array of tine placement is preferred for two principal reasons. First, a helical array minimizes the number of tines in actual contact with lawn thatch at any given moment, thereby avoiding the lurching observed in the operation of the rotary cultivator with the lawn dethatchment means attached when tines are arranged in side-by-side relationship, with corresponding ends of the tines hitting the ground in unison. Second, it has been observed that the helical array results in loosened thatch being carried out and away from the rotary cultivator by reason of the rotation-imposed corkscrew effect transmitted to the thatch by the helical arrangement.

Referring to FIGS. 3 and 4, dethatchment tines 44 of the preferred embodiment are constructed from $\frac{1}{4}$ inch cylindrical spring-steel rods, each having a first end-point 48 and a diametrically opposed second end-point 50, and a mid-point 52. First end point 48 and second end-point 50 of each dethatchment tine 44 are disposed outwardly in diametrically opposite directions from first rigid member 34, and in the same manner from second rigid member 40, and are in linear relationship with geometric chords of the right sections of the cylinders of the preferred embodiment that are first rigid member 34 and second rigid member 40. In other words, end points 48 and 50 lie along a straight line which intersects first rigid member 34 in two places. At first end-point 48 and second end-point 50 of each dethatchment tine 44 of the preferred embodiment, an end portion of each dethatchment tine 44 is bent through an angle of approximately $22\frac{1}{2}$ degrees measured from the axis of such rods, such that said bent portions are in planar relationship with each other and such that each bend is disposed in the direction opposite to the direction of rotation of first rigid member 34 and second rigid member 40 about their axes. End-points 48 and 50 are therefore the last portions of each tine end-portion to contact the thatch. It has been discovered that this leads to a self-cleaning of the tine end-points as a direct result of the smaller angle of incidence of the end-points with the thatch.

Referring to FIG. 4, disposed at midpoint 52 of each dethatchment tine 44 is a pair of diametrically opposed first and second flat portions 54 and 55, respectively, which flat portions are in parallel planar relationship with each other, and which are each in perpendicular planar relationship with the plane defined by end-points 48 and 50 and midpoint 52 of tine 44. First flat portion 54 and second flat portion 55 are formed in the preferred embodiment by cutting or filing tine 44 about midpoint 52 in the manner indicated above.

Referring to FIGS. 3 and 6, each dethatchment tine 44 of the preferred embodiment is rigidly affixed to first rigid member 34, and second rigid member 40, by inserting each tine 44 through fifth through-holes 57 provided in first rigid member 34, and sixth through-holes 57 provided in second rigid member 40. The axes of fifth through-holes 57 are diameter chords of first rigid member 34 as are the sixth through-holes of second rigid member 40. The diameters of fifth through-holes 57, and sixth through-holes 57 of second rigid member 40, are such that tines 44 may be inserted through, and removed completely, from first rigid member 34 and second rigid member 40 with relative ease. The latter function enables tines 44 to be removed from first rigid member 34 and second rigid member 40 for maintenance, repair, or replacement.

In the preferred embodiment, when tines 44 are inserted into first rigid member 34 and second rigid member 40 in the manner described, they are arrested in proper operating position by a tine pin 72 and a tine bolt 74 (FIG. 6) that are operable to arrestingly pinch tine 44 at flat portions 54 and 55. In the preferred embodiment, it is contemplated that tine pin 72 can be permanently affixed to first rigid member 34 and second rigid member 40 by conventional welding techniques. Tine bolt 74 is received into a threaded tine bolt hole 76. The axes of tine pin 72 and tine bolt hole 76 are along the same diametric chord of first rigid member 34 and second rigid member 40, and which are also perpendicular to the axes of tine through holes 57. The location of the diametric chord for tine pin 72 and tine bolt hole 76 is chosen such that when tine bolt 74 is received into tine bolt hold 76 and is tightened against tine 44, tine bolt 74 is received onto flat portion 54 of tine 44 and flat portion 55 of tine 44 abuts tine pin 72. Thus arrested, tine bolt 44 is prevented from rotation about its axis, which is also the axis of through-holes 57, as well as from movement along said axis. Tine 44 is thereby removeably arrested in the proper operation position, as described above, and as will be described further below.

In an alternative, but equally preferred embodiment, tine pin 72 may be replaced with a second tine bolt 78 (FIG. 5), which is received into first rigid member 34 and second rigid member 40 in a tine bolt hole 77 in a manner identical to that described for tine bolt 74, above. In operable effect, second tine 78 functions as does tine bolt 74 to effect the same arresting purpose as tine pin 72.

Referring to FIG. 2, the fifth through-holes 57 are arranged and provided in first rigid member 34 in the manner described above such that when tines 44 are inserted therein, they are arranged in helical array around the cylinder of the preferred embodiment that is first rigid member 34. In similar fashion, dethatchment tines 44 are arranged in helical array around the cylinder of the preferred embodiment that is second rigid member 40, and the following description will be equally applicable thereto, except as noted. The helical angles α of the helical arrays of the preferred embodiment are approximately 60-70, and most preferably about 65, degrees for the dethatchment tines affixed to first rigid member 34, and approximately 120-130, and most preferably about 125, degrees for the dethatchment tines affixed to second rigid member 40. These helical angles are formed in the preferred embodiment by utilizing dethatchment tines 44 that measure approximately 10 inches from first end point 48 to second end point 50 upon the linear measure drawn therebetween after the 20 degree bend has been imparted to the end portions thereof as described above. The detachment tines 44 are affixed in the manner described at about 1 inch intervals between the axes thereof along first rigid member 34 beginning at fourth end 38, with the end points 48 and 50 of each dethatchment tine 44 being rotatingly advanced about the cylinder of the preferred embodiment that is first rigid member 34 through approximately 22½ degrees counterclockwise from the end-points of the immediately preceding dethatchment tine 44, as shown in FIG. 3, until the position to be occupied by first end 32 of rotatably driven shaft 18 is reached. The number of tines that can be placed will, therefore, depend and vary with the length of rotatably driven shaft 18. The same basic methodology is applied to second rigid member 40. However, the dethatchment tines 44 affixed within second rigid member 40 are positioned therein so as to be in mirror image relationship with the dethatchment tines 44 affixed within first rigid member 34.

The described mirror image relationship of the dethatchment tines 44 on either side of gear box 20 is necessary so that corresponding dethatchment tines on either side of gear box 20 strike the thatch in unison, and so that in combination the dethatchment tines 44 along first rigid member 34 and second rigid member 40 create equal but opposite rotation imposed corkscrew effects upon the thatch on either side of gear box 20 thereby causing rotary cultivator 12 to track straight ahead while in operation.

It is contemplated that in the preferred embodiment, the first rigid member 34 will measure approximately 20 inches from third end 36 to fourth end 38 thereof, and that the second rigid member will measure approximately 20 inches from the fifth end to the sixth end thereof. It has been discovered that first and second rigid members of substantially greater length will not be adequately elevated by the support means disclosed herein to compensate for grass lawn undulations, and scalping of the lawns becomes a greater possibility.

Referring to FIGS. 1 and 2, the support means disclosed herein includes a first axle 56 and a second axle 58, and a first utility wheel 60 and a second utility wheel 68. First axle 56 is rigidly affixed to the fourth end 38 of first rigid member 34 in linear relationship with the axis of the cylinder of the preferred embodiment that is first rigid member 34. In the preferred embodiment, it is contemplated that first axle 56 will be of a smaller outside diameter than the inside diameter of the cylinder of the preferred embodiment that is first rigid member 34. First axle 56 is slidably received by and welded by conventional means to a rigid steel washer 62 that has an inside diameter equal to the outside diameter of first axle 56. Washer 62 is affixed by conventional welding techniques to the fourth end 38 of first rigid member 34, the axis of first axle 56 thereby being rigidly affixed in linear relationship with the axis of the cylinder of the preferred embodiment that is first rigid member 34. The above description is symmetrically applicable to the affixation of second axle 58 in linear relationship with the axis of the cylinder of the preferred embodiment that is second rigid member 40.

Referring to FIGS. 1 and 2, first utility wheel 60 and second utility wheel 68 are rotatably mounted upon first axle 56 and second axle 58, respectively, by conventional axle collars 64, which are provided with set screws 66 that lockingly engage first axle 56 and second axle 58 on opposite sides of first utility wheel 60 and second utilitY wheel 68, respectively, thereby permitting each utility wheel to rotate freely and independently upon first axle 56 and second axle 58, respectively. These utility wheels may therefore be rotated independently of the rotation imparted to rotatably driven member 18 thus permitting the lawn dethatcher for a rotary cultivator 10 of the present invention to be moved over a grass lawn by its operator at speeds independent of the rate of rotation imparted to rotatably driven shaft 18.

Referring to FIG. 3, first utility wheel 60 and second utility wheel 68 must be of outside diameters less than the measure of the length between first end-point 48 and second end-point 50 of dethatchment tines 44 to permit the first and second end-points to extend into the lawn below the points of contact between each utility wheel and the lawns to permit the end-points to thereby reach the lawn thatch. It has been determined that dethatchment tines 44 that extend at each end-point ½ inch beyond the utility wheels provides adequate dethatchment action. Thus, if the dethatchment tines 44 each linearly measure 10 inches from end-point 48 to end-point 50, utility wheels 60 and 62 with outside diameters of 9 inches would be dictated.

As rotatably driven shaft 18 rotates clockwise when viewed from the operator's right the bent portion's at first end point 48 and second end-point 50 of each dethatchment tine 44 are alternately allowed to extend into the lawn thatch, to contact the lawn thatch, and to propel the dislodged lawn thatch up, out, and behind rotary cultivator 12, where the thatch can then be easily raked and removed. As first end-point 48 and second end-point 50 are the last points to be in contact with the lawn thatch, their angle of incidence therewith by reason of the disposition of the bent portions tends to result in the end-points being scraped clean by the lawn itself as they rotate free from contact therewith.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A lawn dethatcher for use with a rotary cultivator having a rotatably driven shaft with a first end and a second end and removably affixed cultivating tines disposed at said first end and at said second end, comprising:

lawn dethatcher means selectively interchangeable with the cultivating tines, including a first rigid sleeve member with a third end and a forth end, a second rigid sleeve member with a fifth end and a sixth end, and a plurality of rigid dethatchment tines and received through and removeably affixed in helical array to said first rigid member between said third end and said fourth end, and received through and removeably affixed in helical array to said second rigid member between said fifth end and said sixth end in mirror image relationship to said dethatchment tines affixed between said third end and said fourth end;

attachment means to removably affix said lawn dethatcher means at said first end and said second end to the rotatably driven shaft of a rotary cultivator;

and support means associated with each of said rigid sleeve members to position said lawn dethatcher means at the proper to dethatch grass lawns, said support means being operable free from the rotational influence of the rotatably driven shaft.

2. The lawn dethatcher for a rotary cultivator of claim 1 wherein:

said dethatchment tines include a plurality of rigid rods each with a mid-point and a first end-point and a second end-point, and with a first flat portion and a second flat portion at said mid-point, which flat portions are in parallel planar relationship with each other, and with bent portions at said first end-point and said second end-point that are in planar relationship with each other and that are disposed in the direction opposite the rotation of said rotatably driven shaft, said bent portions being in perpendicular planar relationship with said flat portions, and which tines are removeably received through said first rigid member and second second rigid member and are arrestingly clamped within said first and second rigid members at said first and second flat portions.

3. The lawn dethatcher for a rotary cultivator of claim 2 wherein:

said detachment tines ar removeably affixed in helical array to said first rigid member, with a helix angle between 60 and 70 degrees, and are rigidly affixed in helical array to said second rigid member with a helix angle between 120 and 130 degrees.

4. The lawn dethatcher for a rotary cultivator of claim 2 wherein:

said first and second rigid members are cylinders.

5. The lawn dethatcher for a rotary cultivator of claim 1 wherein:

said attachment means includes a first through-bolt and a second through-bolt, said third end of said first rigid member slidably received over said first end of said rotatably driven shaft, said first through-bolt passing through said first rigid member and said rotatably driven shaft, and said fifth end of said rigid second member slidably received over said second end of said rotatably driven shaft, said second through-bolt passing through said second rigid member and said rotatably driven shaft.

6. The lawn dethatcher for a rotary cultivator of claim 1 wherein:

said support means includes a first axle and a second axle, a first utility wheel and a second utility wheel, and further including said first axle rigidly affixed to said fourth end of said first rigid member in coaxial relationship therewith, said second axle rigidly affixed to said sixth end of said second rigid member in coaxial relationship therewith, and further including wheel attachment means to rotatably and removably mount said first and second utility wheels to said first and second axles, respectively.

7. The lawn dethatcher for a rotary cultivator of claim 6 wherein:
   said first and second wheels have outside diameters of lesser measure than the linear measure of the lengths of said dethatchment tines.

8. A lawn dethatcher for a rotary cultivator, comprising:
   a rotary cultivator, including a rotatably driven shaft with a first end and a second end, and removably affixed cultivating tines disposed at said first end and said second end;
   lawn dethatcher means selectively interchangeable with the cultivating tines, including a first rigid sleeve member with a third end and a forth end, a second rigid sleeve member with a fifth end and a sixth end, and a plurality of rigid dethatchment tines received through and removeably affixed in helical array to said first rigid member between said third end and said fourth end, and received through and removeably affixed in helical array to said second rigid member between said fifth end and said sixth end in mirror image relationship to said dethatchment tines affixed between said third end and said fourth end;
   attachment means to removably affix said lawn dethatcher means at said first end and said second end; and
   support means associated with each of said rigid sleeve members to position said lawn dethatcher means at proper elevation to dethatch grass lawns, said support means being operable free from the rotational influence of the rotatably driven shaft.

* * * * *

UNITED STATES PATENT AND TRADEMARK OFFICE
CERTIFICATE OF CORRECTION

PATENT NO. : 4,802,536           Page 1 of 2

DATED : February 7, 1989

INVENTOR(S) : Ronald L. O'Neal

It is certified that error appears in the above-identified patent and that said Letters Patent is hereby corrected as shown below:

In the Abstract on the title page, line 6, please change "removeably" to --removably--.

In column 1, line 44, please change the word "forth" to --fourth--.

In column 1, line 46, please change the word "removeably" to --removably--.

In column 1, line 48, please change the word "removeably" to --removably--.

In column 1, line 62, please delete the word "a" where it appears in such line.

In column 1, line 65, please change the word "forth" to --fourth--.

In column 1, line 67, please change the word "removeably" to --removably--.

In column 2, line 1, please change the word "removeably" to --removably--.

In column 3, line 24, please change the word "seond" to --second--.

In column 3, line 49, please change the word "forth" to --fourth--.

In column 3, line 62, please change the word "shaf" to --shaft--.

In column 4, line 10, please delete the word "a" where it appears at the second location in such line.

In column 5, lines 53-54, please change the word "removeably" to --removably--.

In column 6, line 17, please change the word "detachment" to --dethatchment--.

In column 7, line 16, please change the word "utilitY" to --utility--.

UNITED STATES PATENT AND TRADEMARK OFFICE
CERTIFICATE OF CORRECTION

PATENT NO. : 4,802,536

DATED : February 7, 1989

INVENTOR(S) : Ronald L. O'Neal

It is certified that error appears in the above-identified patent and that said Letters Patent is hereby corrected as shown below:

In column 8, line 1, please change the word "forth" to --fourth--.

In column 8, line 4, please change the word "removeably" to --removably--.

In column 8, line 7, please change the word "removeably" to --removably--.

In column 8, line 17, please insert between the words "proper" and "to" the missing word --elevation--.

In column 8, line 33, please change the word "removeably" to --removably--.

In column 8, line 40, please change the word "ar" to --are--.

In column 8, line 40, please change the word "removeably" to --removably--.

In column 9, line 18, please change the word "forth" to --fourth--.

In column 10, line 2, please change the word "removeably" to --removably--.

Signed and Sealed this

Twenty-fifth Day of July, 1989

Attest:

DONALD J. QUIGG

Attesting Officer

Commissioner of Patents and Trademarks